J. E. HITCH.
VULCANIZING APPARATUS.
APPLICATION FILED AUG. 25, 1910.
999,029.
Patented July 25, 1911.
2 SHEETS—SHEET 2.
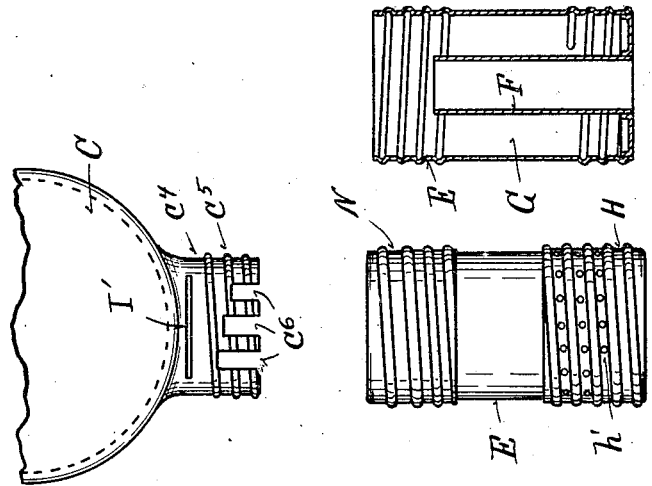
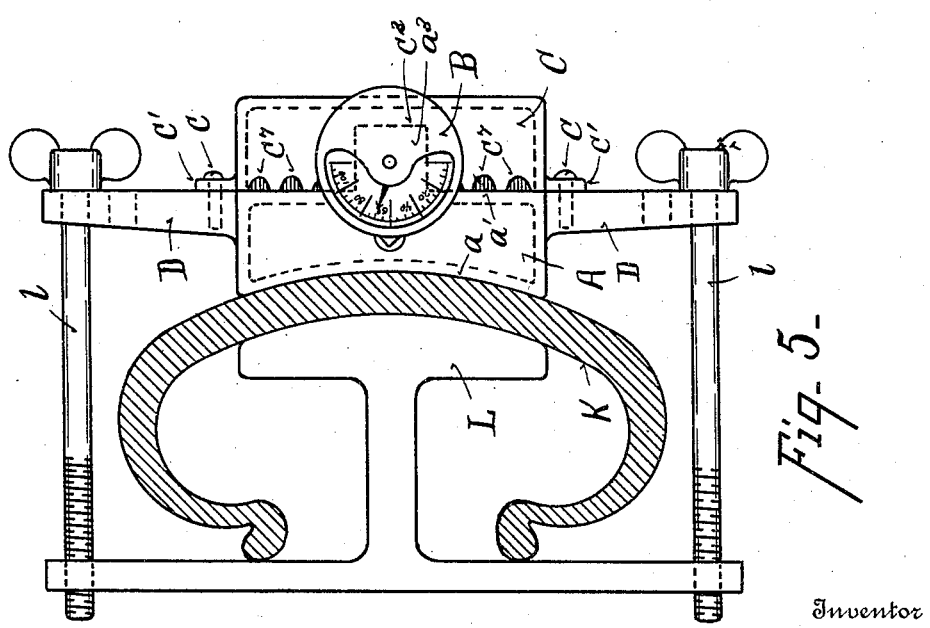

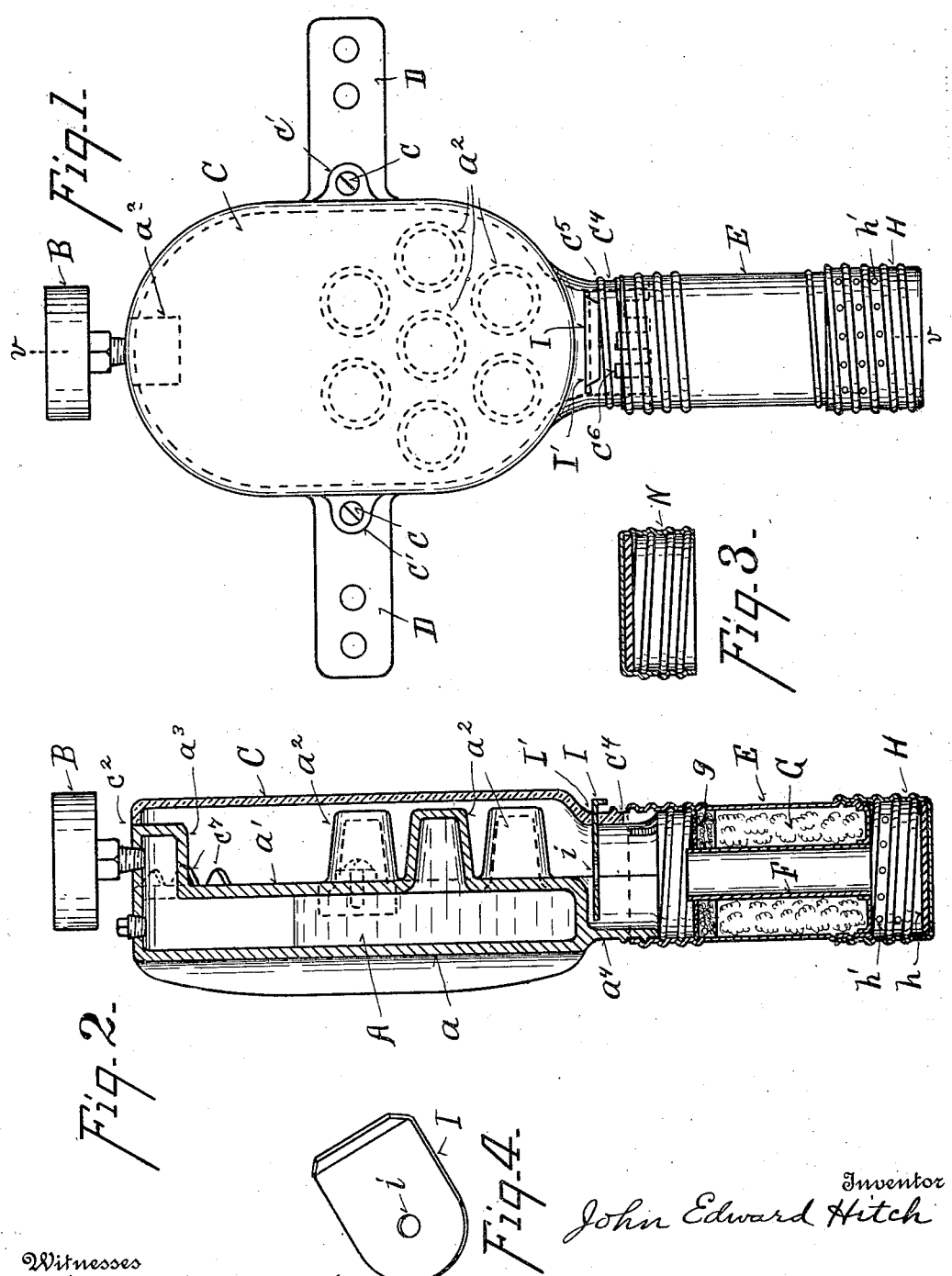

UNITED STATES PATENT OFFICE.

JOHN EDWARD HITCH, OF DAYTON, OHIO, ASSIGNOR TO THE AUTO-STEAM VULCANIZER COMPANY, OF CINCINNATI, OHIO, A CORPORATION OF OHIO.

VULCANIZING APPARATUS.

999,029.  Specification of Letters Patent.  Patented July 25, 1911.

Application filed August 25, 1910.  Serial No. 578,883.

*To all whom it may concern:*

Be it known that I, JOHN EDWARD HITCH, a citizen of the United States, residing at Dayton, in the county of Montgomery and State of Ohio, have invented certain new and useful Improvements in Vulcanizing Apparatus, of which the following is a specification.

My invention relates to improvements in portable vulcanizing apparatus.

One of its objects is to provide vulcanizing apparatus self contained and portable in nature, and adapted to be readily and quickly applied wherever required.

Another object is to provide apparatus adapted to quickly generate the degree of heat required.

Another object is to provide means to conveniently, accurately and uniformly maintain the degree of heat required for the purpose.

Another object is to provide means to indicate the degree of heat attained and any change in the degree of heat to enable the desired degree of heat for the purpose to be secured and uniformly maintained.

It further consists in certain details of form, combination and arrangement, all of which will be more fully described in connection with the accompanying drawings in which;

Figure 1 is a front elevation of my improved apparatus with the burner in place and drafts partly open. Fig. 2 is a central vertical section through the same on line $v$ $v$ of Fig. 1. Fig. 3 is a central vertical section through one of the burner caps. Fig. 4 is a perspective view of the burner draft regulating slide. Fig. 5 is a top plan view of my improved apparatus in one position for use. Fig. 6 is a front elevation of a portion of the vulcanizer with the burner detached. Fig. 7 is a side elevation of the burner with caps on or closed ready for transportation or storage. Fig. 8 is a central vertical section through the body of the burner detached.

My improved vulcanizer comprises preferably a steam generator chamber, a steam pressure gage, a burner adapted to consume preferably a liquid fuel, a flue directing the heated products of combustion from the burner into contact with the steam generating chamber, and means to protect the flame of the burner from excessive air currents, and to control the air supply to the burner so as to uniformly maintain the desired pressure and temperature in the steam generator until the vulcanizing operation is completed.

In the accompanying drawings A represents the heater or steam generator which comprises a closed hollow shell adapted to contain a quantity of water. One face $a$ of the generator is so shaped as to be clamped upon and to heat the article to be vulcanized. The opposite face $a'$ is preferably provided with a series of hollow projections $a^2$ communicating on the inside with the generating chamber and adapted to expose a large surface of the generator to the action of the heated gases from the burner to enable the desired steam pressure in the generator to be quickly attained. The projections $a^2$ may be of various pattern.

A projection $a^3$ of the generator from its face $a'$ is also preferably provided to serve as a suitable place for the attachment of a steam pressure gage B, and also by acting as a lateral support and guide to assist in holding the flue plate or cap C in position. The steam generator is preferably cast in one piece with its steam chamber cored out.

The flue plate or cap C is fitted closely to the outer edges of the face $a'$ of the generator being held in place by screws $c$ passing through ears $c'$ on the flue plate and threaded into lugs D projecting from the generator A. The upper end of flue plate C has a recess $c^2$ into which the projection $a^3$ fits. The lower end of the flue plate and the generator have semi-tubular projections $a^4$ $c^4$ which when united form a tube having preferably a raised external thread $c^5$ over which the upper end of the external burner tube is adapted to be threaded to secure the burner to the generator. The flue plate C has at its upper end a series of openings $c^7$ through which the heated gases from the burner may escape from the flue.

The burner comprises an external tube E and an internal tube F between which is an annular space G which is preferably packed or filled with absorbent material such as sponge or cotton waste to be saturated with liquid fuel such as alcohol or gasolene. A wire screen $g$ is also preferably employed to hold the absorbent material in place.

H represents a cap having preferably a disk of rubber or cork $h$ inside next to its head and threaded to engage the lower end of the external burner tube E. The cap H is preferably provided with a series of perforations $h'$ arranged spirally so as to be successively uncovered as the cap H is unscrewed from the burner tube, the object of said perforations being to supply air in regulated quantity to the inner burner tube F, and to protect the burner flame from excessive air currents where the vulcanizer is used in the open air.

The projection $c^4$ of the flue plate C is provided with a series of progressively deeper notches $c^6$ which are adapted to be progressively covered as the external burner tube is adjusted or screwed farther up on the tube formed by projections $a^4$ $c^4$, thereby enabling the quantity of air admitted through notches $c^6$ to be accurately regulated and the flame protected at this point from excessive air currents. A slide plate I having a perforation $i$ is also preferably employed to assist in regulating the heat to the generator. This slide is adapted to be introduced to a greater or less extent through a slit I' in the projection $c^4$ to close the flue opening above the burner.

In operation the heater or steam generator A is clamped upon the face of the article K to be vulcanized, by strapping it directly to an inflated rubber tire or by means of a plate L to support the opposite face of the article K, to which the generator A is attached by bolts $l$. The burner when not in use is tightly capped at the lower end by cap H, the disk $h$ of which when screwed home forms a tight joint with the bottom of the burner, and a cap N having a disk similar to disk $h$, which when screwed to place serves to close the upper end of the burner, and to prevent the escape or loss of the fuel or danger from its becoming ignited. After removing the cap N and partially or entirely unscrewing the cap H the burner is ignited at the face of the screen $g$ and the burner tube E screwed upon the end of the tube formed by projections $a^4$ $c^4$. Air is supplied to support combustion through the inner burner tube F, and the amount thereof can be regulated by turning the cap H to expose a greater or less number of perforations $h'$ below the lower end of the tube E. At the commencement of the vulcanizing operation air is liberally supplied to the lower end of tube F to secure a maximum flame and to quickly raise the generator to the desired temperature, which is indicated, say when the pressure gage indicates a pressure of sixty five pounds, the supply of air at the lower end of tube F is then reduced and the supply of air through the notches $c^6$ regulated, and the slide I inserted and adjusted so as to maintain a small flame at the burner sufficient to maintain a uniform gage pressure until the vulcanizing operation is completed, after which the flame is extinguished, the burner again detached and capped, and the heater A detached from the article. The air supplied through the notches $c^6$ may with a large flame serve to support combustion, and with a small flame may serve to dilute and reduce the temperature of the products of combustion. A uniform heat is secured over the entire face $a$ of the generator.

The mechanism herein illustrated and described is capable of considerable modification without departing from the principle of my invention.

Having described my invention, what I claim is:

1. In an apparatus of the character described, a heater provided with a fluid containing chamber, mechanism to indicate the temperature in said chamber, a flue chamber in contact with one face of said heater, a burner connected to said flue chamber, a draft opening at the lower end of said flue chamber and above the flame of said burner adapted to be employed either to promote combustion or to supply air to dilute and cool the products of combustion, and means to vary the extent of said draft opening.

2. In an apparatus of the character described, a heater provided with a fluid containing chamber, mechanism to indicate the temperature in said chamber, a flue chamber in contact with one face of said heater, an adjustable draft opening located above the burner in the inlet end of said flue, a burner detachably connected to said flue inlet, said burner comprising an external shell, an internal draft tube, an annular fuel receptacle, and a member located at the lower end of said draft tube adapted to be adjusted to supply varying quantities of air to said draft tube and to protect the air supply to said draft tube from the effect of external air currents.

3. In an apparatus of the character described, a heater provided with a fluid containing chamber and having a face adapted to be clamped to an article to be vulcanized, mechanism to indicate the temperature in said chamber, a flue chamber in contact with one face of said heater, a downwardly projecting flue inlet imperforate on the side adjacent to the vulcanizing face of said heater and to which a burner is adapted to be attached, a burner adapted to be attached to said flue inlet, and an adjustable draft opening at the lower end of said flue chamber and above the flame of said burner.

4. In an apparatus of the character described, a heater provided with a fluid containing chamber and having a face adapted to be clamped to an article to be vulcanized, mechanism to indicate the temperature in said chamber, a flue chamber in contact with one face of said heater, a downwardly projecting flue inlet having a section on the side adjacent to the vulcanizing face of said heater formed integral with said heater and imperforate and to which flue inlet a burner is adapted to be attached, a burner adapted to be attached to said flue inlet, and an adjustable draft opening at the lower end of said flue chamber and above the flame of said burner.

5. In an apparatus of the character described, a heater provided with a vapor generating chamber, a pressure gage to indicate the pressure in said generating chamber, a flue chamber in contact with one face of said heater, a tubular inlet to said flue chamber, a draft opening in said tubular inlet, a burner comprising an external shell, an internal draft tube, an annular fuel receptacle, and means to control the air supply to said draft tube, said burner being adapted to be detachably connected to said tubular flue inlet and adjustable thereon to vary the draft opening in said flue inlet.

6. In an apparatus of the character described, a heater provided with a vapor generating chamber, a pressure gage to indicate the pressure in said generating chamber, a flue chamber in contact with one face of said heater, a tubular inlet to said flue chamber, a draft opening in said tubular inlet, a burner comprising an external shell, an internal draft tube, an annular fuel receptacle, and means to control the air supply to said draft tube, said burner having threaded engagement with said tubular flue inlet and adjustable thereon to vary the draft opening in said flue inlet.

7. In an apparatus of the character described, a heater provided with a vapor generating chamber, a pressure gage to indicate the pressure in said generating chamber, a flue chamber in contact with one face of said heater, a tubular inlet to said flue chamber, a burner comprising an external shell, an internal draft tube, an annular fuel receptacle, a cap threaded to the lower end of said burner and provided with draft openings adapted to be successively opened or closed by adjusting said cap, said burner being adapted to be detachably connected to said tubular flue inlet.

8. In an apparatus of the character described, a heater provided with a vapor generating chamber, a pressure gage to indicate the pressure in said generating chamber, a flue chamber in contact with one face of said heater, a tubular inlet to said flue chamber, an adjustable slide movable across said tubular flue inlet, a burner comprising an external shell, an internal draft tube, an annular fuel receptacle, and means to control the air supply to said draft tube, said burner being connected to said tubular flue inlet.

9. In an apparatus of the character described, a heater provided with a fluid containing chamber, mechanism to indicate the temperature in said chamber, a flue chamber in contact with one face of said heater, a burner connected to said flue chamber, adjustable draft openings above the flame of said burner adapted to be employed either to promote combustion or to supply air to dilute and cool the products of combustion, and mechanism to regulate the air supply to said burner below said flame.

10. In an apparatus of the character described, a heater provided with a vapor generating chamber and having a face adapted to be clamped to an article to be vulcanized, a pressure gage to indicate the pressure in said generating chamber, a substantially vertical flue chamber in contact with one face of said heater through which a current of heated products is adapted to flow upwardly and from which said products escape at the upper end, blind extensions of said generating chamber projecting into the path of said current of heated products in said flue chamber to increase the vapor generating surface of said generating chamber, means to supply heat to said flue chamber, and adjustable mechanism to vary the quantity of heat supplied to said flue chamber.

11. In an apparatus of the character described, a heater provided with a chamber adapted to contain a fluid, mechanism to indicate the temperature of the fluid in said chamber, a substantially vertical flue chamber in contact with one face of said heater through which a current of heated products is adapted to flow upwardly and from which said products escape at the upper end, extensions of said heating chamber projecting into the path of said current of heated products in said flue chamber to increase the internal heating surface of said liquid chamber, means to supply heat to said flue chamber, and mechanism to vary the quantity of heat supplied to said flue chamber.

12. In an apparatus of the character described, a heater provided with a chamber adapted to contain a fluid, mechanism to indicate the temperature of the fluid in said chamber, a flue chamber in contact with one face of said heater, a burner adapted to be detachably connected to the inlet opening of said flue chamber, and means to close opposite ends of said burner when detached.

In testimony whereof I have affixed my signature in presence of two witnesses.

JOHN EDWARD HITCH.

Witnesses:
MARY E. IRONS,
JOSEPH IRONS.

Copies of this patent may be obtained for five cents each, by addressing the "Commissioner of Patents, Washington, D. C."